(12) United States Patent
Watabe (10) Patent No.: US 10,204,249 B2
(45) Date of Patent: Feb. 12, 2019

(54) INFORMATION CODE READING SYSTEM AND INFORMATION CODE READER

(71) Applicant: DENSO WAVE INCORPORATED, Chita-gun, Aichi-pref. (JP)

(72) Inventor: Motoaki Watabe, Chita-gun (JP)

(73) Assignee: DENSO WAVE INCORPORATED, Aichi-Pref. (JP)

( * ) Notice: Subject to any disclaimer, the term of this patent is extended or adjusted under 35 U.S.C. 154(b) by 0 days.

(21) Appl. No.: 15/543,004

(22) PCT Filed: Jan. 13, 2016

(86) PCT No.: PCT/JP2016/050810
§ 371 (c)(1),
(2) Date: Jul. 12, 2017

(87) PCT Pub. No.: WO2016/114294
PCT Pub. Date: Jul. 21, 2016

(65) Prior Publication Data
US 2018/0025194 A1 Jan. 25, 2018

(30) Foreign Application Priority Data
Jan. 13, 2015 (JP) .................................. 2015-004087

(51) Int. Cl.
*G06K 19/00* (2006.01)
*G06K 7/10* (2006.01)
*G06K 7/14* (2006.01)

(52) U.S. Cl.
CPC .......... *G06K 7/10722* (2013.01); *G06K 7/14* (2013.01); *G06K 7/1417* (2013.01)

(58) Field of Classification Search
USPC .................................. 235/435, 439, 454, 462
See application file for complete search history.

(56) References Cited

U.S. PATENT DOCUMENTS

2005/0011957 A1* 1/2005 Attia ................. G06F 17/30879
235/462.46
2014/0014724 A1 1/2014 Koziol et al.

FOREIGN PATENT DOCUMENTS

| EP | 1 355 258 A2 | 10/2003 |
| JP | 2010-074389 A | 4/2010 |
| JP | 2013-222368 A | 10/2013 |
| JP | 2014-29659 A | 2/2014 |

OTHER PUBLICATIONS

Feb. 9, 2016 International Search Report issued in International Patent Application No. PCT/JP2016/050810.

* cited by examiner

*Primary Examiner* — Matthew Mikels
(74) *Attorney, Agent, or Firm* — Oliff PLC (57) ABSTRACT

In an information code reader, an image is imaged by an imager. An information code contained in the image is quantified depending on light-dark levels thereof (tones, color depths, or luminance levels thereof), thereby providing cell information by this quantification. The obtained cell information is transmitted to from the information code reader to a server. In the server, based on the cell information received from the reader, the information code imaged by the imager is decoded. Decoded information is transmitted to the information code reader so that the reader is perform control based on the decoded results.

12 Claims, 7 Drawing Sheets

INFORMATION CODE READING SYSTEM AND INFORMATION CODE READER

CROSS-REFERENCE TO RELATED APPLICATION

This application is based on and claims the benefit of priority from earlier Japanese Patent Application No. 2015-4087 filed on Jan. 13, 2015 the descriptions of which are incorporated herein by reference.

BACKGROUND

Technical Field

The present invention relates to an information code reading system and information code reader, which are able to optically read information codes such as two-dimensional information codes.

Background Art

In some of conventional systems, a technique is employed in which an information code reader is used to read information codes, and acquired data are sent to a server. In the server, the received data are processed into a desired kind of data. However, in a case where data read by the information code reader is provided to the server without any protective measures, there is a concern that a third party may obtain the read data dishonestly. If the information code records thereon data which should be kept in secret (secret data), the convectional systems may have problems with security. To overcome this problem, there can be provided a measure, with which image data acquired by imaging an information code are sent to a server, and the information code is decoded in the server.

For example, in an information processing apparatus disclosed by the patent reference 1, image data, obtained by scanning a script using a printing machine, are sent to a delivery server. When receiving, this delivery server detects a bar code from the received image data and decodes the detected bar code, providing barcode information.

CITATION LIST

Patent Literature

[PTL 1] JP 2010-074389 A

Technical Problem

In the case where image data obtained from the information code is sent to the server, secret data will not be sent directly to the server, thereby providing improved security. However, there is another difficulty raised in such a system. That is, a transmission time necessary for the transmission is forced to be longer with an increase in the size of image data. This means that the transmission of the image data from the information code reader to the server requires a longer time. This results in a lowered reading speed in the information code reader.

SUMMARY

Thus it is desired to provide an information code reading system and an information code reader, which are able to have improved security for reading an information code and still avoid the reading speed from lowering An exemplary embodiment provides an information code reading system provided with an information code reader and a server which are communicable to each other, an information code being read by the information code reader and being configured to have a plurality of types of cells arranged, tones, depths, or luminance levels of the cells being different between the types, characterized in that the information code reader comprises imaging means for imaging the information code; cell information generating means for generating cell information by quantifying the cells of the information code contained in an image imaged by the imaging means, depending on the tones, depths, or luminance levels; and transmitting means for transmitting to the server the cell information generated by the cell information generating means, and the server comprises decoding means for decoding the information code imaged by the imaging means, based on the cell information received from the information code reader; and server-side controlling means for performing control based on results decoded by the decoding means.

In the exemplary embodiment, when the respective cells of an information code included in an image imaged by the imaging means are quantified in accordance with their tones, depths, or luminance levels (for example, light and dark levels) in the information code reader, this quantified cell information is transmitted to the server. The server receives the cell information from information code reader, and uses the cell information to decode the information code imaged by the imaging means. As control is carried out based on a recording result, the decoded information is transmitted from the server to the information code reader.

In this way, from the server to the information code reader, the decoded results themselves are not transmitted but the quantified cell information is transmitted. Because of this transmission of the quantified cell information, third parties cannot obtain decoded results from the quantified cell information, resulting in higher security of the information code. In particular, the cell information can be made much smaller in its volume compared with image data, with the result that the time necessary for the transmission to the server can be avoided from being larger and the reading steed in the information code reader can be avoided from lowering. Accordingly, in reading the information code, it is possible to have higher security and avoid the reading speed from lowering.

Preferably, the transmitting means transmit, to the server, the cell information when the determining means determine that it is possible to correct the cell information. As a result, it is not required for the server to send a request for re-transmitting cell information due to failure in the decoding process, thereby preventing or reducing the reading speed from being lowered which is due to the failure in the decoding process.

Preferably, the transmitting means transmits, to the server, the cell information of which error has been corrected by the error correcting means, when the determining means determine that it is possible to correct the cell information. As a result of this scheme, the server is relieved from performing an error correcting process for received cell information. It is therefore possible to reduce or avoid the reading speed from being lowered, and alleviate a calculation load for the decoding process in the server.

Preferably, the server-side controlling means transmits, to the information code reader, at least a part of the decoded results. Hence, the information code reader can also obtain read information and others as at least part of the decoded results of the information code imaged by the imaging means.

Preferably, the server-side controlling means transmits, to the information code reader, information which is obtained from the decoded results but different from the decoded result. Hence, for example, to an information code reader which images an information code in which information for determining true or false is recorded, true/false determined results of the image code can be sent to the reader, where the true/false determined results are different from the decoded results.

In an exemplary embodiment of an information code reader, when the cells of an information code, which is included in an image imaged by the imaging means, are quantified by the cell information generating means in accordance with their tones, depths, or luminance levels (for example, light and dark levels), the generated cell information is transmitted to the transmitting means. Responsively to this transmission, control based on information received from the server is performed by the reader-side controlling means.

Hence, from the server to the information code reader, the decoded results themselves are not transmitted but the quantified cell information is transmitted. Because of this transmission of the quantified cell information, third parties cannot obtain decoded results from the quantified cell information, resulting in higher security of the information code. In particular, the cell information can be made much smaller in its volume compared with image data, with the result that the time necessary for the transmission to the server can be avoided from being larger and the reading steed in the information code reader can be avoided from lowering. Accordingly, in reading the information code, it is possible to have higher security and avoid the reading speed from lowering.

Preferably, the transmitting means transmits, to the server, the cell information when the determining means determine that it is possible to correct the cell information. As a result, it is not required for the server to send a request for re-transmitting cell information due to failure in the decoding process, thereby preventing or reducing the reading speed from being lowered due to failure in the decoding process.

Still preferably, the transmitting means transmit, to the server, the cell information of which error is corrected by the error correcting means, when the determining means determine that it is possible to correct the cell information. As a result of this scheme, the server is relieved from performing an error correcting process for received cell information. It is therefore possible to reduce or avoid the reading speed from being lowered, and alleviate a calculation load on the decoding process in the server.

DESCRIPTION OF EMBODIMENTS

[First Embodiment]

Figure 1:
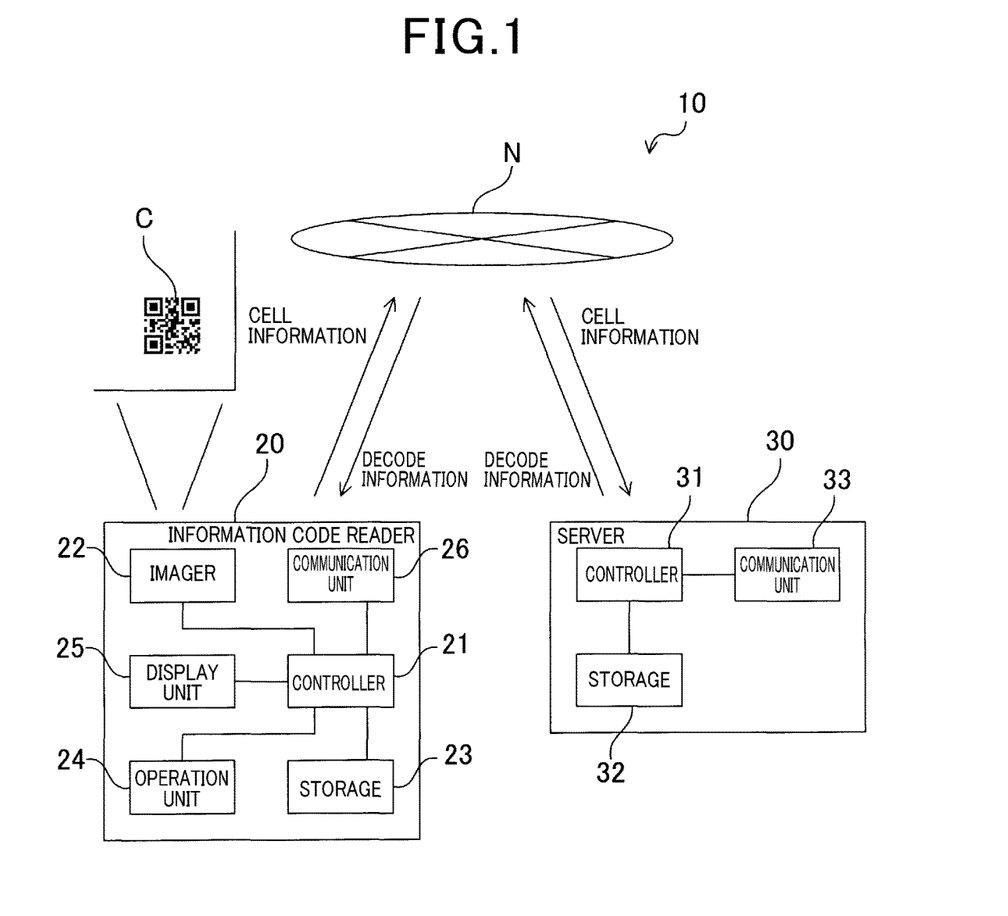
FIG. 1 is an illustrative diagram outlining the configuration of an information code reading system according to a first embodiment.

With reference to the accompanying drawings, a first embodiment, in which an information code reader and an information code reading apparatus according the present invention are implemented, will now be described. FIG. 1 illustratively shows an outline of the configuration of an information code reading system 10 according to the first embodiment.

As shown in FIG. 1, the information code reading system 10 according to the present embodiment is provided with one or more information code readers 20 and a server 30 which has a decoding function capable of decoding an information code imaged by the information code reader 20. The information code readers 20 and the server 30 are communicably connected with each other via a network N, such as the Internet.

Both the information code reading system 10 and the information code reader 20 are configured to read an information code in which a plurality of types of cells are arranged. Such cells consist of cells whose tones, depths, or luminance levels are different type by type from each other. Practically in the present embodiment, an information code C is provided as a QR code (registered trademark) in which two types of cells, which consist of light color cells and dark color cells, are arranged. The QR code is configured such that position detecting patterns, data code words, error correction code words, and other necessary cells are arranged. The code words are arranged to have a predetermined number of cells composed of light color cells and dark color cells. The data code words are composed of such code words to code data to be decoded. The error correction code words are provided for error correction. That is, in the QR code, there is provided an error correction region with the error correction code words for correcting errors of information expressed by cell arrangements.

First, the information code reader 20 will now be described about its configuration. This information code reader 20 is equipped with a controller 21 to process image data obtained by an imager 22. The imager 22 has an optical camera function which outputs pixel signals which are for the image data. This information code reader 20 may be provided as a device dedicated to optically read information codes or may be provided as a mobile type of device realized for example by install predetermined application programs into terminals such as a smartphone having a camera function. In this embodiment, the imager 22 is provided as an element corresponding to imaging means.

The controller 21 is structured with a microcomputer which is provided as one key element, so that this microcomputer can provide a CPU (central processing unit), a system bus, an input/output interface, and other necessary elements. It is thus possible that, together with a storage 23, the controller 21 is able to have a function of an information processor. The storage 23 is composed of known semiconductor memories such as a ROM (read-only memory), a RAM (random access memory) and/or nonvolatile memories. In the storage 23, predetermined programs for optically reading information codes and other necessary programs are stored in advance, resulting in that various programs can be executed by the controller 21.

The information code reader 20 is provided with an operation unit 24, a display unit 25, and a communication unit 26. Of these units, the operation unit 24 is provided as a device which has keys and other input means, thereby being able to input to the controller 21 information in response to manual key operations. The display unit 25, which is for example composed of a liquid crystal device, can be controlled in its display states by the controller 21. The display unit 25 can thus function to display information resulting from reading an information code and inform users of the information. The communication unit 26, which is under control of the controller 21, is to communicate, in a wireless manner, with the server 30 and other apparatuses via the network N.

The server 30 will now be described.

The server 30 can serve as a decoding server which decodes information codes captured by the image code reader 20 based on information received from the information code reader 20. This server 30 is provided as ones of main components, a storage 32, a communication unit 33, and a controller 31 controlling of such components as a whole. The controller 31 is structured with a microcomputer which is provided as one key element, so that this microcomputer can provide a CPU (central processing unit), a system bus, an input/output interface, and other necessary elements. It is thus possible that, together with a storage 32, the controller 31 is able to have a function of an information processor. The storage 32 is composed of known semiconductor memories such as a ROM (read-only memory), a RAM (random access memory) and/or nonvolatile memories. In the storage 32, application programs for a decode process applied to information received from the information code reader 20, and other necessary programs are stored in advance, resulting in that various programs can be executed by the controller 31. The communication unit 33, which is under control of the controller 31, is to communicate, in a wireless manner, with the information code reader 20 and other external apparatuses via the network N.

Figure 2:
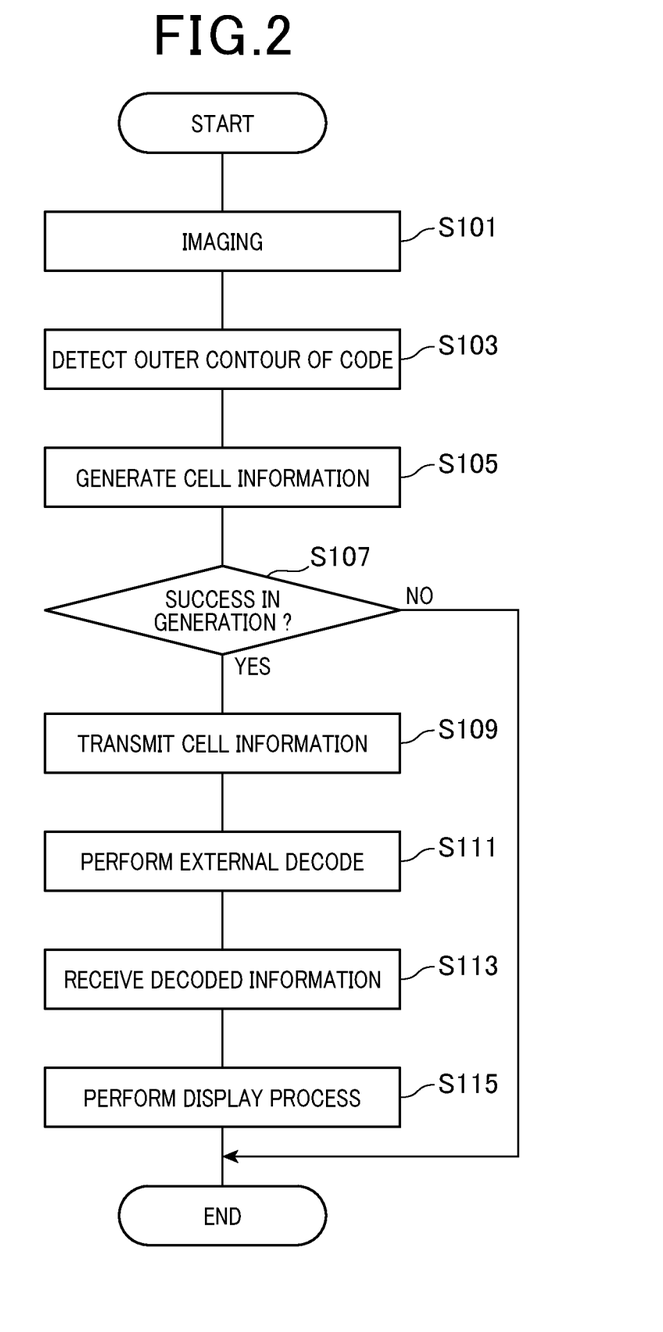
FIG. 2 is a flowchart exemplifying a flow for a reading process executed by a controller installed in the information code reading apparatus according to the first embodiment.
Figure 3:
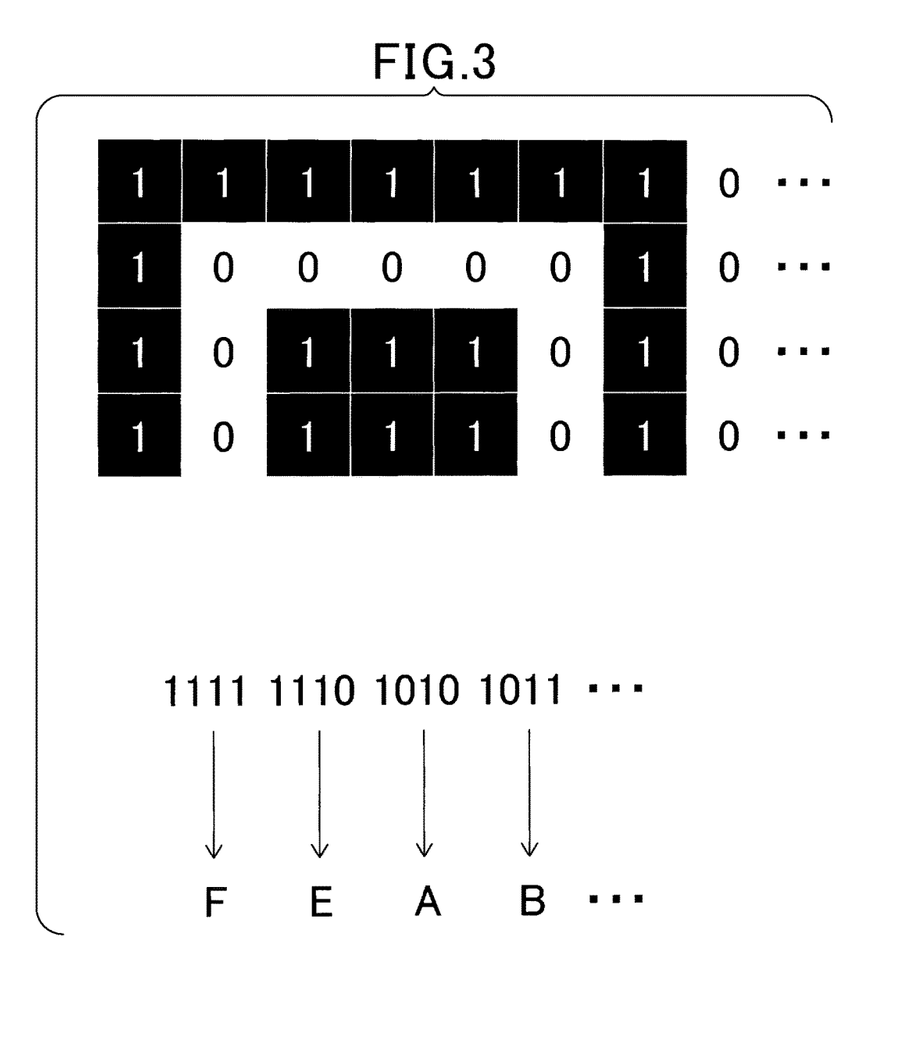
FIG. 3 is an illustrative diagram explain cell information generated from a code image.
Figure 4:
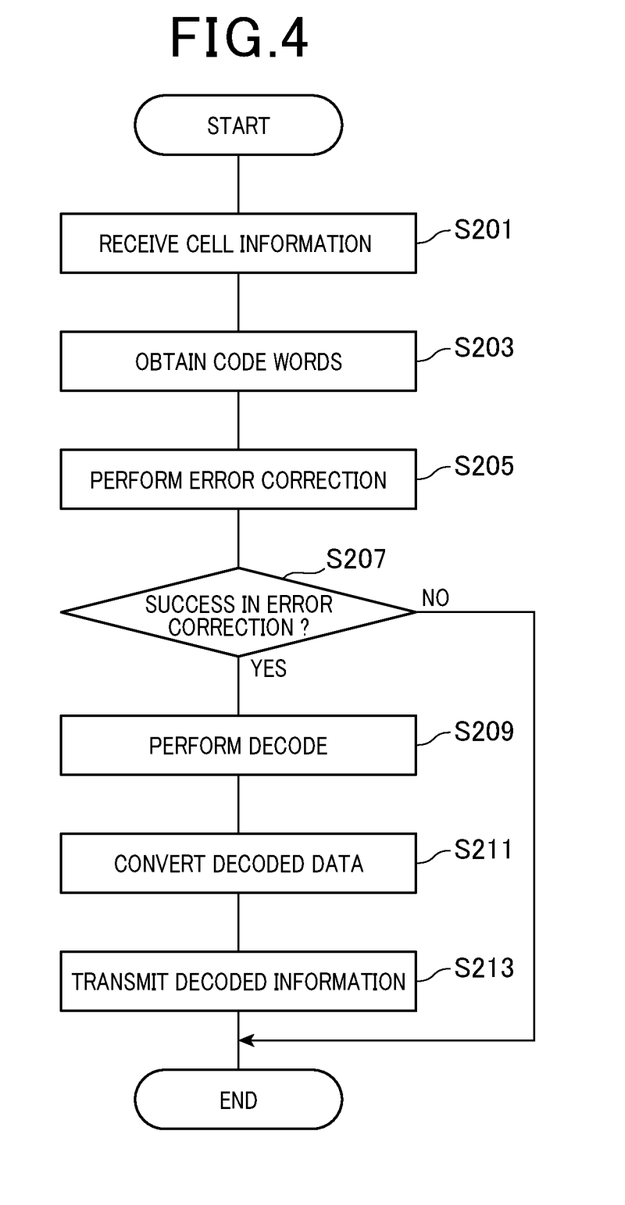
FIG. 4 is a flowchart exemplifying a flow for an external decoding process executed by a controller installed in a server according to the first embodiment.

Referring now to FIGS. 2 to 4, a process for reading an information code in the information code reading system 10 configured as above will be described. FIG. 2 exemplifies a flowchart of a reading process executed by the controller 21 of the information code reader 20 in the first embodiment. FIG. 3 illustrates, by way of example, information about cells (cell information) generated from a code image, and FIG. 4 exemplifies a flowchart of an external decoding process executed by the controller 31 of the server 30. In the illustration of FIG. 3, a part arranged next to a position detection pattern of a QR code (registered trademark) is shown, where a relationship between an arrangement of light color cells and dark color cells and cell information is explained.

With reference to the flowchart shown in FIG. 2, the reading process executed by the controller 21 of the information code reader 20 will now be described.

In response to a user's particular key operation on the input unit 24, the controller 21 starts its reading process. That is, when the camera of the imaging unit 22 is oriented toward an information code C and a user's imaging operation is given, an imaging process at a step S101 in FIG. 2 is executed. That is, the imaging unit 22 optically reads the information code C for reading.

Then at step S103, the outer contour of the code is detected. Practically, when the image imaged by the imaging unit contains an information code, the outer contour of the code occupied in the image is detected. Then at step S105, a cell information generating process is performed, in which, as shown in FIG. 3, the respective cells, which compose the extracted code image, are classified into binary cells composed of light and dark cells, on the basis of a predetermined threshold. Through this procedure, information showing how light color cells and dark color cells are arranged (hereinafter, this information is referred to as cell information) is generated. Thus, by way of example, the process at step S105 functionally corresponds to cell information producing means.

When the cell information is generated successfully (YES at step S107), the processing proceeds to a cell information transmission process at step S109. As a result, the communication unit 26 transmits the cell information, generated as above, to the server 30 via the network N. In contrast, when the cell information is generated unsuccessfully due to, for example, improper imaging of the information code C (NO at step S107), the procedures of step S109 and thereafter are skipped, terminating the reading process. The process at step S109 functionally corresponds to transmission means.

After the transmission of the cell information, the performance of an external decoding process is waited (S111) and information showing decoded results, described later, is received from the server 30 (S113). A display process at step S115 is then performed. In this displaying process, the information indicative of the decoded results received from the server 30 is displayed by the displaying unit 25 to present the decoded results. When information showing failure of the decoding process, described later, is received from the server 30 (step S113), such information is presented, together with reasons of the failure and other necessary information, by the displaying unit 25 (step S115). The step S115 thus functionally corresponds to a reader-side controlling means.

Referring now to FIG. 4, the external decoding process executed by the controller 31 of the server 30 will be described.

In the server 30, the controller 31 starts to perform the decoding process and the communication unit 33 thereof receives the cell information from the information code reader 20 via the network N (step S201 in FIG. 4), a code word obtaining process is performed at step S203. That is, based on arranged states (or arrangements) of the respective light and dark color cells obtained from the received cell information, strings of code words are obtained.

At step S205, a known error correcting process is then applied to the acquired code word strings. When this error correcting process has been performed successfully (YES at step S207), a decoding process is applied to the error-corrected code word strings at step S209, so that the error-corrected code word strings are decoded into information according to a predetermined rule of the decode (step S211). Then, by a decoded information transmission process performed by the communication unit 33 at step S213, the above converted decoded data are transmitted as decoded information to the information code reader 20 via the network N. In contrast, if the error correction is unsuccessful at step S205 (NO at step S207), information showing a failure in the decoding process and the reason of the failure are transmitted to the information code reader 20 as decoding failure information (step S213). In the present embodiment, the process at step S209 corresponds to an example of decoding means and the process at step S213 corresponds to an example of server-side controlling means.

As described, in the information code reading system 10 according to the present embodiment, when the respective cells of an information code C included in an image imaged by the imager 22 are quantified (or digitized) in accordance with their light and dark levels (tones, depths, or luminance levels) in the information code reader 20, this quantified cell information is transmitted to the server 30. The server 30 receives the cell information from information code reader 20, and uses the cell information to decode the information code C imaged by the imager 22. As control is carried out based on a recording result, the decoded information is transmitted from the server 30 to the information code reader 20.

In this way, the decoded results themselves are not transmitted from the server 30 to the information code reader 20, but the quantified cell information is transmitted. Because of this transmission of the quantified cell information, third parties cannot obtain decoded results from the quantified cell information, resulting in higher security of the information code C. In particular, the cell information can be made much smaller in volume compared with image data, with the result that the time necessary for the transmission to the server 30 can be avoided from being larger and the reading steed in the information code reader 20 can be avoided from lowering. Accordingly, in reading the information code, it is possible to have higher security and avoid the reading speed from lowering.

In particular, the decoded results are transmitted to the information code reader 20 in the foregoing decoded information transmission process (step S213). Hence, the information code reader 20 is able to obtain the decoded results of the information code imaged by the imager 22, thus enabling control using the obtained decoded results even in the reader 20.

By the way, the information code reading system 10 will not limited to, as described, the decoded results are returned from the server 30 to the information code reading apparatus 20 to which the cell information is sent. As a modified embodiment, at least a part of the decoded results may be transmitted from the sever 30 to the reader 20. Alternatively, in the information code reading system 10, when the cell information is sent to from the information code reader 20 to the server 30, the sever 30 itself can be configured to be able to perform a process based on the decoded results (for example, a counting process of the decoded results and others), without transmitting the decoded results and other data to the reader 20.

In addition, the information code reading system 10 can be configured to transmit, from the server 30 to the reader 20, information which is obtained from the decoded data but is different from the decoded results themselves. For example, there can be provided a case where an information code includes information for determining true or false of the information code and the server 30 is configured to determine whether or not the information code is authentic on the basis of the decoded results of the information code. In this case, true/false determined results of the image code imaged by the information code reader 20 can be sent back to the reader 20 as information which is different from the decoded results themselves.

[Second Embodiment]

Figure 5:
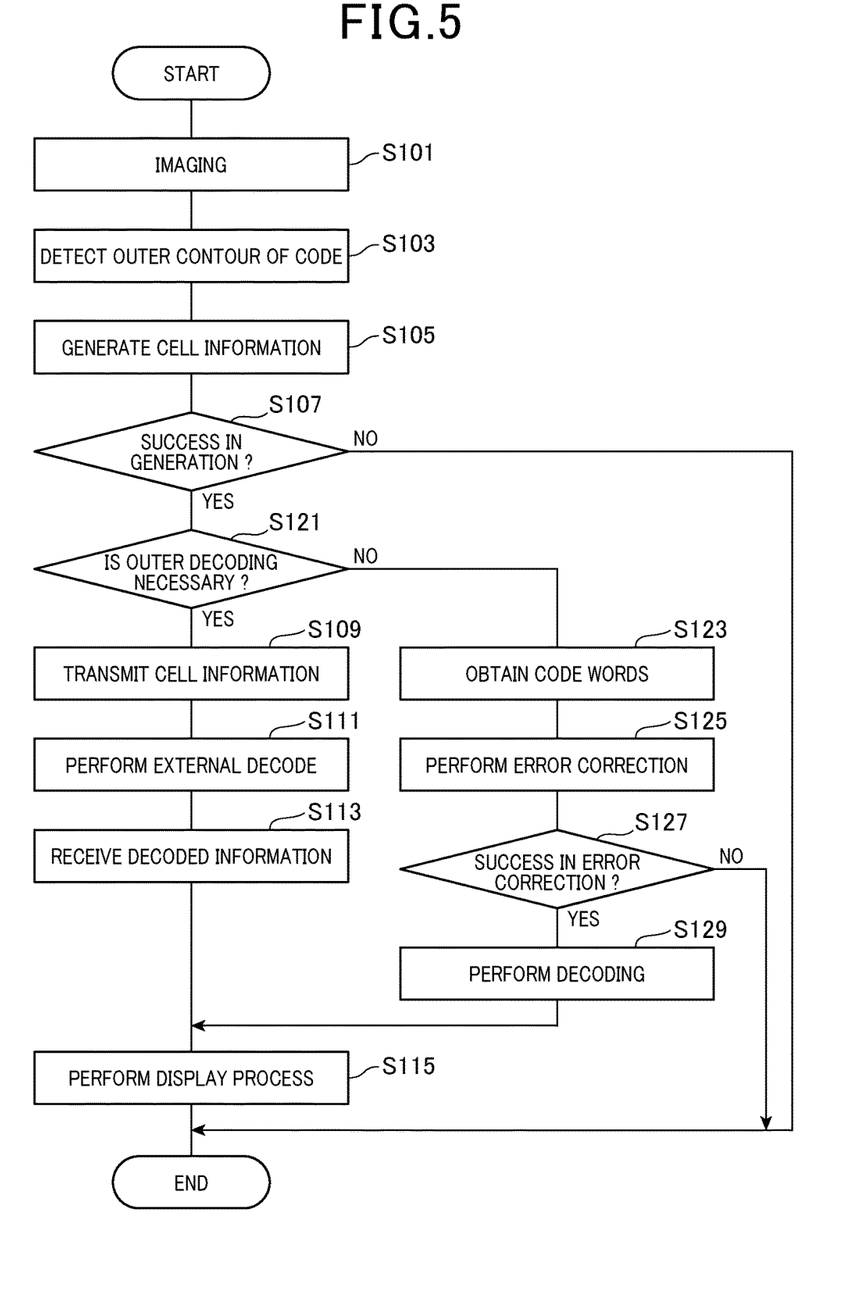
FIG. 5 is a flowchart exemplifying a flow for a reading process executed by a controller installed in an information code reading apparatus according to a second embodiment.

With reference to FIG. 5, an information code reading system according to a second embodiment of the present invention will now be described.

FIG. 5 is a flowchart exemplifying a flow of a reading process executed by a controller installed in an information code reader according to the second embodiment.

The second embodiment mainly differs from the first embodiment in that it is decided whether or not the external decoding process is performed, depending on types of information codes and other factors related to the codes. Hence, the equivalent or similar components to those in the first embodiment are given the same reference numbers for the sake of omission of redundant explanation.

In the information code reading system 10 of the present embodiment, the information code reader 20 is configured to carry out the foregoing reading process depending on the type or other information of an imaged information code meets a predetermined condition. If this predetermined condition is met, the external decoding process can be performed by the server 30, while if the predetermined condition is not met, the decoding process can be performed by the information code reader 20 itself.

Practically, for example, in cases where an imaged information code includes partly non-disclosed (i.e., private) data, the server 30 is used to perform the external decoding process (which is executed outside the reader). If an imaged information code is not a partly non-disclosed code but a non-encrypted normal information code, the information code reader 20 is responsible for the decoding process by itself. In this way, the information code reading system 10 can be configured.

In general, the partly non-disclosed (private) code described above is configured to be provided with a non-disclosed region and a disclosed region. Non-disclosed data which are encrypted using a predetermined encrypting key are recorded in the non-disclosed region, while disclosed data which are not encrypted are recorded in the disclosed region. Hence the partly non-disclosed code can be decrypted (decoded) only when a decrypting key in compliance with the encrypting key. The disclosed region of this partly non-disclosed code is configured to as a region from which a reader with no decrypting key can be read as well. As the disclosed data, there can be provided a variety of types of data which are allowed to be disclosed to third parties. Meanwhile the non-disclosed data are for example personal information such as names, addresses and/or ages.

With reference to a flowchart of FIG. 5, a reading process in the present embodiment, which is for a partly non-disclosed code, will now be detailed. This reading process involves an external decoding process. It is assumed that, in the present embodiment, a decrypting key is previously recorded in the storage 32 of the serve 30 for decrypting the non-disclosed region of the partly non-disclosed code.

When cell information is generated successfully via processes similar to the first embodiment (YES at step S107 in FIG. 5), the processing proceeds to step S121. At this step, it is determined whether or not an information code imaged at the imaging process at step S101 requires an external decoding process executed by the server.

If it is determined that the imaged information code is an ordinal information code whose cells are not encrypted based on the cell information, the determination is that the external decoding process is not necessary (NO at step S121). In this case, a process to obtaining code words is executed at step S123. In this obtaining process, based on arranged states (or arrangements) of the respective light and dark cells, which arranged states are obtained from the cell information generated by the cell information generating process at step S105, strings of code words are acquired. The processing then proceeds to step S125 where an error correcting process is performed. That is, the acquired code word strings are subjected to error correction based on a known technique. When this error correction has been performed successfully (YES at step S127), a decoding process is then performed at step S129. By this decoding process, the error-corrected code word strings are decrypted (decoded) into pieces of information based on a give decoding rule. The decoded results are then displayed on the display unit 25 (step S115). If the error collection has failed (NO at step S127), the reading process will be terminated without executing the decoding process.

On the other hand, when it is determined based on the cell information that the imaged information code is a partly non-disclosed code, the external decoding process is required (YES at step S121). In this case, the steps of S109 and steps following thereof are executed. In this case, in the server 30, the decoding process, i.e., the external decoding process, is performed based on the cell information received from the reader 20, so that the disclosed and non-disclosed data are decrypted (decoded). The decoded disclosed and non-disclosed data are then transmitted to the reader 20 as information showing decoded results.

As described, in the information code reading system 10 according to the present embodiment, as long as the imaged information code meets the predetermined condition for the types and others thereof (e.g., the imaged information code is a partly non-disclosed code), the server 30 carries out the decoding process (i.e., the external decoding process in the embodiment). However the predetermined condition is not met (e.g., the imaged information code is not a partly non-disclosed code), the information code reader 20 is in charge of executing a decoding process by itself.

In this embodiment, similarly to the foregoing first embodiment, the decoded results are not transmitted from the reader 20 to the server 30. Instead the quantified cell information is transmitted from the reader 20 to the server 30. It is therefore possible to obtain higher security and prevent a reading speed from being lowered in reading an information code. Particularly, due to the fact that it is not necessary to store a decrypting key in the reader 20, higher security can be gained in reading the information code.

As a modification, the disclosed region can be decoded in the reader 20 when the imaged information code is determined to be a partly non-disclosed code. Moreover, in such a determined case, only the non-disclosed region can be relied on the decoding process carried out in the server 30 (i.e., the external decoding process).

Another modification concerns with transmission of the cell information to the sever 30. In the embodiment, when the imaged information code is determined to be a partly non-disclosed code, the cell information is sent to the sever 30 for the reason that the external decoding process is needed. However this is just an example. Alternatively, in cases where a reset condition, such as an imaged information code is found to be a preset type of code or others, is met which requires the external decoding process, the cell information can be sent to the server 30.

[Third Embodiment]

Figure 6:
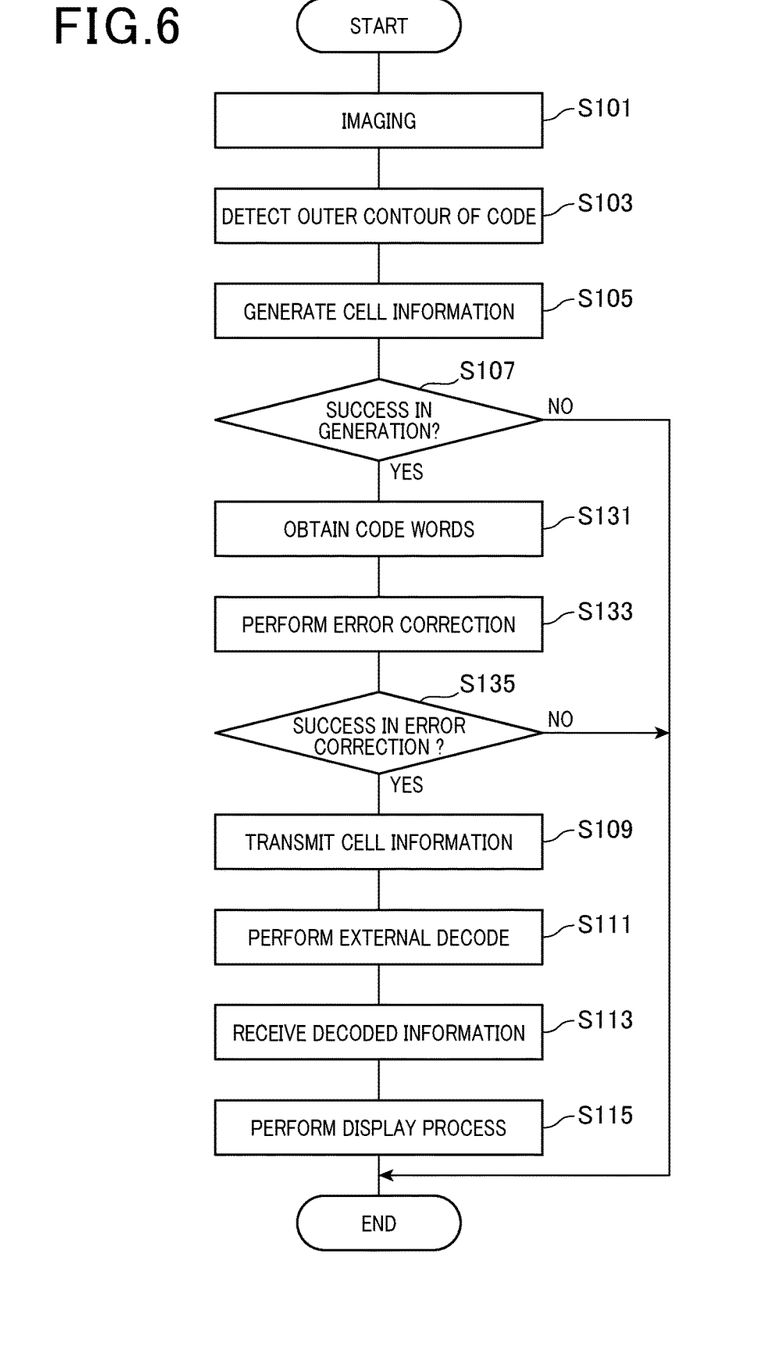
FIG. 6 is a flowchart exemplifying a flow for a reading process executed by a controller installed in an information code reading apparatus according to a second embodiment.

With reference to FIG. 6, an information code reading system according to a third embodiment of the present invention will now be described.

FIG. 6 exemplifies, in a flowchart, a reading process executed by a controller arranged in an information code reader according to a third embodiment.

The third embodiment differs from the foregoing first embodiment in that, when cell information in the error correcting region has been successful in the error correction, the cell information is finally transmitted to the server 30. Essential similar configurations to those in the first embodiment are given the same reference numbers for omission of redundant explanations.

With reference to the flowchart shown in FIG. 6, the reading process according to the present embodiment will now be described.

When the cell information is generated successfully via the procedures similar to those in the first embodiment (YES at step S107 of FIG. 6), the processing proceeds to step S131 where a code word obtaining process is carried out. In this step, arranged states of the light and dark color cells are used, which are obtained from cell information generated by the cell information generating process at step S105. Based on information about the arranged states, code word strings are obtained. Then at step S133, an error correction process is performed with which the obtained code word strings are subjected to the error correction of which the scheme is known. In response to success of this error correction (YES at step S135), the step S109 and steps following step S109 are conducted in turn. Hence, as long as it is determined that the cell information obtained by the cell information generating process (step S105) can be corrected, the cell information generated by the cell information generating process is transmitted to the server 30.

In contrast, when the error correction has been unsuccessful (NO at step S135), the step S109 and steps thereafter are skipped to terminate the reading process. In the current embodiment, the determination process at step S133 exemplifies a process serving as error correcting means, and the determination process at step S135 exemplifies a process serving as determining means.

As described, the information code reading system 10 of the present embodiment transmits the cell information to the server 30 when it is determined that the cell information obtained by the cell information generating process (step S105) is correctable by the error correcting process (S133) (i.e., YES at step S135). Hence, it can be avoided to transmit to the server 30 uncorrectable cell information, i.e., the cell information which cannot be decoded. As a result, it is not required for the server 30 to send a request for re-transmitting cell information due to failure in the decoding process, thereby preventing or reducing the reading speed from being lowered which is due to the failure in the decoding process.

[Fourth Embodiment]

Figure 7:
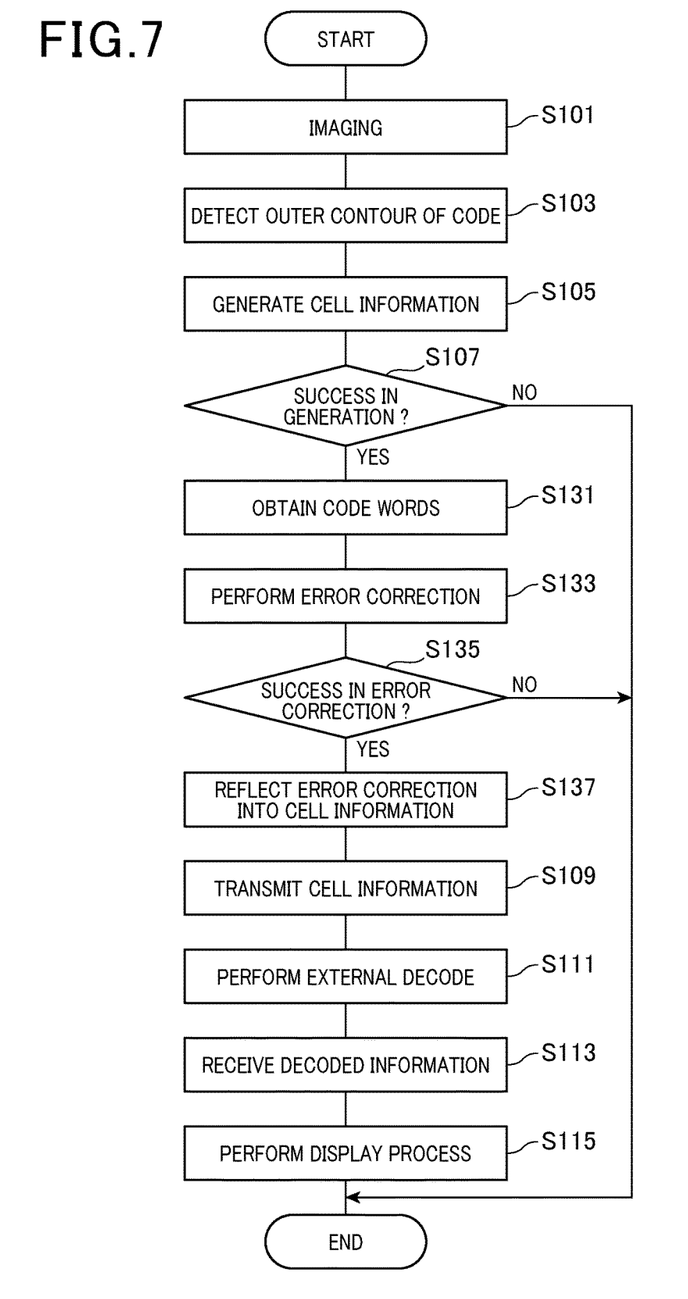
FIG. 7 is a flowchart exemplifying a flow for a reading process executed by a controller installed in an information code reading apparatus according to a second embodiment.

With reference to FIG. 7, an information code reading system according to a fourth embodiment of the present invention will now be described.

FIG. 7 exemplifies, in a flowchart, a reading process executed by a controller arranged in an information code reader according to a third embodiment.

As a main point, the fourth embodiment differs from the foregoing third embodiment in that, when the error correction has been successful, the error-corrected cell information is transmitted to the server 30. Essential similar configurations to those in the third embodiment are given the same reference numbers for omission of redundant explanations.

With reference to the flowchart shown in FIG. 7, the reading process according to the present embodiment will now be described.

When the cell information is generated successfully via the procedures similar to those in the third embodiment (YES at step S107 of FIG. 7), the processing proceeds to step S131 where a code word obtaining process is carried out. The obtained code word strings are then subjected to a known error correction (step S133). When this error correction has been performed successfully (YES at step S135), this error correction is reflected into the cell information (step S137), and then the resultant error-corrected cell information is transmitted to the server 30 (step S109). That is, only when it is determined that the cell information can be corrected via the error correcting process (step S133), the error-corrected cell information will be sent to the server 30.

As described, in the information code reading system 10 according to the present embodiment, only when it is determined that the cell information generated by the cell information generating process (step S105) is correctable by the error correcting process (step S133) (YES at step S135), the cell information which has been subjected to the error correction in the error correcting process is provided to the server 30. As a result of this scheme, the server 30 is relieved from performing both an error correcting process (step S205) for received cell information and the determination process at step S207. It is therefore possible to reduce or avoid the reading speed from being lowered, and alleviate a calculation load for the decoding process in the server 30.

[Other Modifications]

The present invention will not be limited to the constructions described in the foregoing embodiments, but can be developed into various other modes.

(1) In the foregoing embodiments, an information code to be read in the present invention has been limited to a QR code (registered trademark) in which two type of cells which are composed of light and dark color cells, but other types of two-dimensional or one-dimensional codes can be adopted as such a target. The two-dimensional codes include DataMatrix codes and MaxiCodes, while the one-dimensional codes include bar codes.

(2) An information code to be read in the present invention can be a color code composed of a plurality of types of cells, which are different from each other in tones, depths, or luminance levels among the types. For example, the present invention may be targeted to a color code to be read, which is composed of black, white, green, blue, cyan-color, magenta-color, and yellow cells. In this color code, cell display colors are made to correspond to numerical values such that, by way of example, the first color "white" is assigned to a data value 0; the second color "red" to a data value 1; the third color "green" to a data value 2; the fourth color "blue" to a data value 3; the fifth color "magenta" to a data value 4; the sixth color "yellow" to a data value 5; the seventh color "cyan" to a data value 6; and the eighth color "black" to a data value 7, respectively. In this case where the cell colors are assigned to the numerical values, the cell information is not information composed of binarized values, but information composed of multivalued data, and these multivalued data are transmitted as the cell information to the server 30. Even if this kind of a color code is employed, the cell information generated from such a color code is sent to the server 30, so that it is possible to secure higher security and to prevent or reduce the reading speed from lowering in reading a color code, i.e., the information code.

(3) In the present invention, the information code reader 20 is not always limited to a mobile reader, but may be configured as a stationary type of information code reader.

REFERENCE SIGNS LIST

10 . . . information code reading system
20 . . . information code reader
21 . . . controller 21 (cell information generating means, reader-side controlling means, error correcting means, determining means),
22 . . . imager (imaging means)
26 . . . communication unit (transmitting means)
30 . . . server
31 . . . controller (decoding means, server-side controlling means)

What is claimed is:

1. An information code reading system provided with an information code reader and a server which are communicable to each other, an information code being read by the information code reader and being configured to have a plurality of types of cells arranged, tones, depths, or luminance levels of the cells being different between the types,
   the information code reader comprising:
      an imager for imaging the information code;
      a cell information generating unit, functionally provided by a reader-side computer, the cell information generating unit generating cell information, wherein the cell information generating unit i) quantifies the cells of the information code contained in an image imaged by the imager, depending on the tones, depths, or luminance levels, and ii) generates the cell information including arranged states of the quantified cells;
      a communication unit configured to communicate with the server; and
      a transmitting unit, functionally provided by the reader-side computer, the transmitting unit activating the communication unit to transmit to the server the cell information generated by the cell information generating unit, and
   the server comprising:
      a decoding unit, functionally provided by a server-side computer, the decoding unit decoding the information code imaged by the imagingunit, based on strings of code words derived from the cell information received via the communication unit from the information code reader; and
      a server-side controlling unit, functionally provided by the server-side computer, the server-side controlling unit performing control which is based on results decoded by the decoding unit.

2. The information code reading system of claim 1, wherein
   the information code contains an error correction region for correcting an error in the information code,
   the information code reader comprises
      an error correcting unit, functionally provided by the reader-side computer, the error correcting unit correcting the error in the cell information obtained by the cell information generating unit, based on information in the error correction region, and
      a determination unit, functionally provided by the reader-side computer, the determination unit determining whether or not it is possible that the cell information obtained by the cell information generating unit can be corrected by the error correcting unit, and
   the transmitting unit is configured to activate the communication unit so as to transmit, to the server, the cell information when the determining unit determines that it is possible to correct the cell information.

3. The information code reading system of claim 2, wherein
   the transmitting unit is configured to activate the communication unit so as to transmit, to the server, the cell information of which error have been corrected by the errorcorrecting unit, when the determining unit determines that it is possible to correct the cell information.

4. The information code reading system of claim 1, wherein the server-side controlling unit is configured to transmit, to the information code reader, at least a part of the decoded results.

5. The information code reading system of claim 1, wherein the server-side controlling unit is configured to activate the communication unit so as to transmit, to the information code reader, information which is obtained from the decoded results but different from the decoded result.

6. An information code reader, the reader optically reading an information code in which a plurality of types of cells are arranged, the cells having tones, depths, or luminance levels which are different between the types, the reader comprising:
   an imager imaging the information code;
   a cell information generating unit, functionally provided by a reader-side computer, the cell information generating unit generating cell information, wherein the cell information generating unit i) quantifies the cells of the information code contained in an image imaged by the imager, depending on the tones, color depths, or luminance levels, and ii) generates the cell information indicating arranged states of the quantified cells;
   a communication unit configured to communicate with a server provided externally outside the information code reader;
   a transmitting unit, functionally provided by the computer, the transmitting unit activating the communication unit to transmit to the server the cell information generated by the cell information generating unit, the server decodingthe cell information transmitted from the information code reader; and
   a reader-side controlling unit, functionally provided by the computer, the reader-side controlling unit performing control based on information received from the server in response to transmitting the cell information.

7. The information code reader of claim 6, the information code contains an error correction region for correcting an error of the information code, wherein
   the information code reader comprises
   an error correcting unit, functionally provided by the computer, the error correcting unit correcting the error of the cell information obtained by the cell information generating unit, based on information in the error correction region, and
   a determining unit, functionally provided by the computer, the determining unit determining whether or not it is possible that the cell information obtained by the cell information generating unit is corrected by the error correcting unit, and
   the transmitting unit is configured to activate the communication unit so as to transmit, to the server, the cell information when the determining unit determines it is possible to correct the cell information.

8. The information code reader of claim 7, wherein
   the transmitting unit is configured to activate the communication unit so as to transmit, to the server, the cell information of which error is corrected by the error correcting unit, when the determining unit determines it is possible to correct the cell information.

9. The information code reading system of claim 2, wherein the server-side controlling unit is configured to activate the communication unit so as to transmit, to the information code reader, at least a part of the decoded results.

10. The information code reading system of claim 2, wherein the server-side controlling unit is configured to activate the communication unit so as to transmit, to the information code reader, information which is obtained from the decoded results but different from the decoded result.

11. The information code reading system of claim 3, wherein the server-side controlling unit is configured to activate the communication unit so as to transmit, to the information code reader, at least a part of the decoded results.

12. The information code reading system of claim 3, wherein the server-side controlling unit is configured to activate the communication unit so as to transmit, to the information code reader, information which is obtained from the decoded results but different from the decoded result.

* * * * *

UNITED STATES PATENT AND TRADEMARK OFFICE
CERTIFICATE OF CORRECTION

PATENT NO. : 10,204,249 B2
APPLICATION NO. : 15/543004
DATED : February 12, 2019
INVENTOR(S) : Motoaki Watabe Page 1 of 1

It is certified that error appears in the above-identified patent and that said Letters Patent is hereby corrected as shown below:

In the Claims

In Column 12, Line 35, "imagingunit" should be ---imaging unit---.

In Column 13, Line 1, "errorcorrecting" should be ---error correcting---.

In Column 13, Line 33, "decodingthe" should be ---decoding the---.

Signed and Sealed this
Twenty-first Day of May, 2019

Andrei Iancu
*Director of the United States Patent and Trademark Office*